United States Patent [19]
McNelley

[11] Patent Number: 6,104,424
[45] Date of Patent: Aug. 15, 2000

[54] FOLDABLE EYE CONTACT COMPONENTS FOR A DUAL MODE DISPLAY

[75] Inventor: Steve H. McNelley, San Juan Capistrano, Calif.

[73] Assignee: Videotronic Systems, San Juan Capistrano, Calif.

[21] Appl. No.: 09/262,987

[22] Filed: Mar. 5, 1999

Related U.S. Application Data

[63] Continuation-in-part of application No. 09/108,476, Jul. 1, 1998, which is a continuation-in-part of application No. 08/530,880, Sep. 20, 1995, Pat. No. 5,777,665.

[51] Int. Cl.[7] ..................................... H04N 7/12
[52] U.S. Cl. ................................. 348/20; 348/14; 353/74
[58] Field of Search .................................. 348/14, 15, 20, 348/335, 834, 835; 313/478, 474; 353/74, 75, 72, 30

[56] References Cited

U.S. PATENT DOCUMENTS 5,666,153   9/1997   Copeland ................................. 348/20
5,953,052   9/1999   McNelley ................................. 348/20

*Primary Examiner*—Wing F. Chan
*Attorney, Agent, or Firm*—Stefan J. Kirchanski, Esq.; Graham & James LLP

[57] ABSTRACT

The present invention permits a dual mode use of a display screen of which in one mode the display screen is accessible and in the second mode has placed in front of the display screen videoconferencing eye contact components. The invention utilizes a uniquely hinged folded eye contact component apparatus which permits in the major embodiment of the present invention all of the eye contact components including the partially silvered mirror to fold with more than a one-half rotational turn entirely over to the back side of the flat panel display completely out of view. The folded eye contact components are attachable to existing flat panel displays and also are illustrated built in as a part of the flat panel housing. The same hinged folding function is also demonstrated as being suspended separate from the monitor so that no attaching to the display is required. Additional embodiments include adaptations for portable computers, flexible partially silvered mirrors that can be rolled up as well as other unique embodiments.

52 Claims, 15 Drawing Sheets

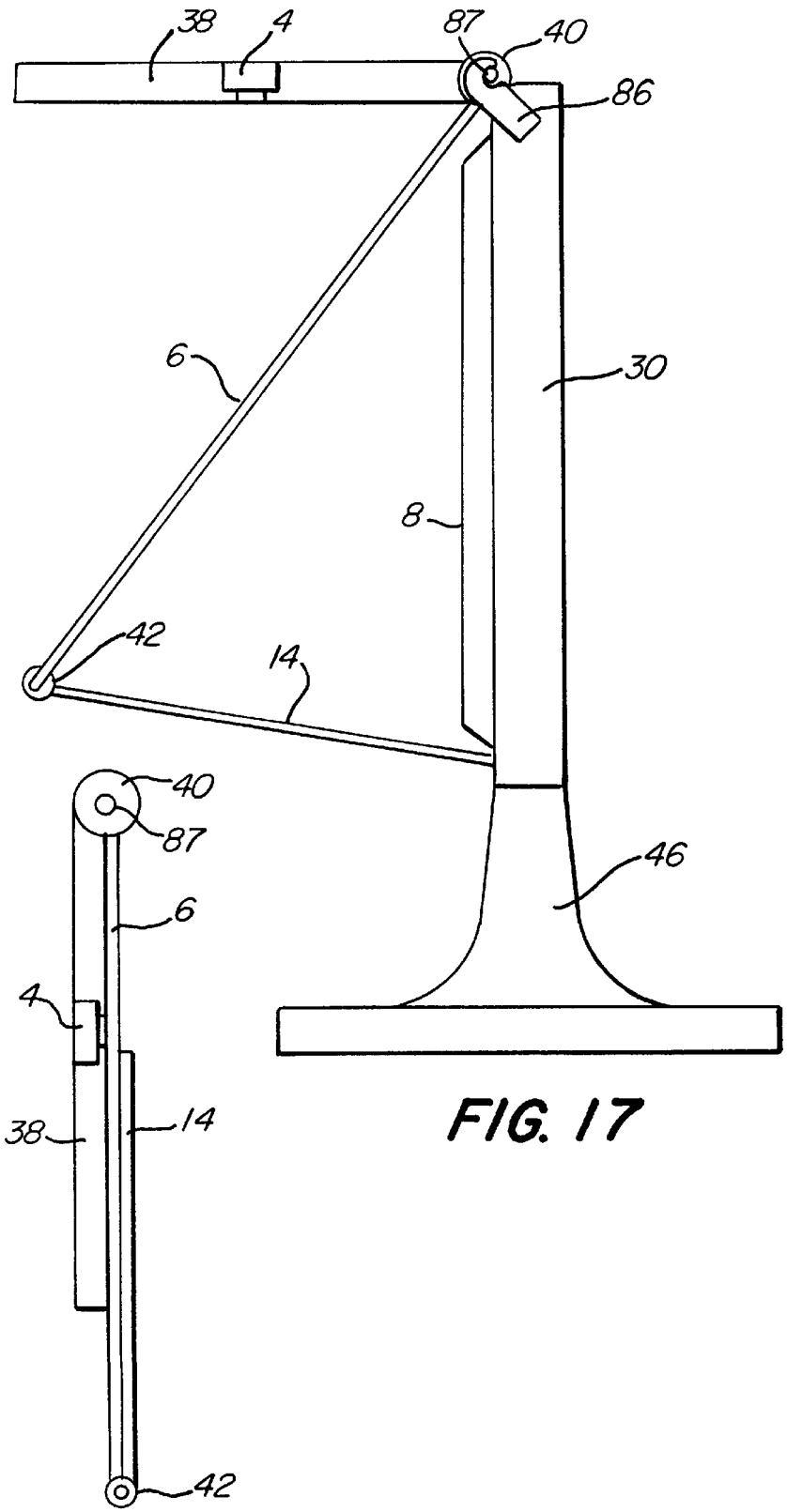

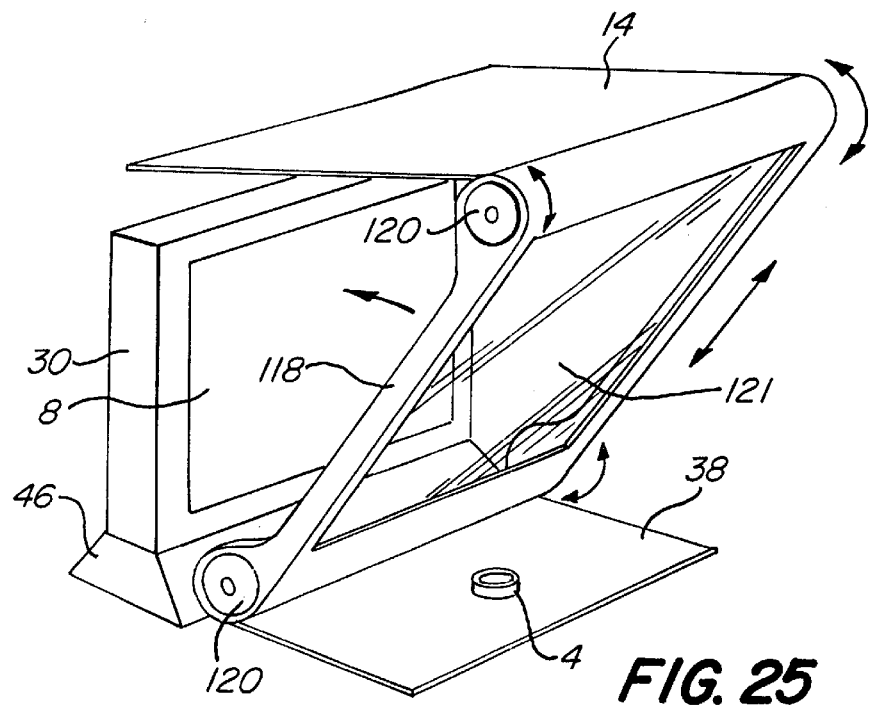
FIG. 25
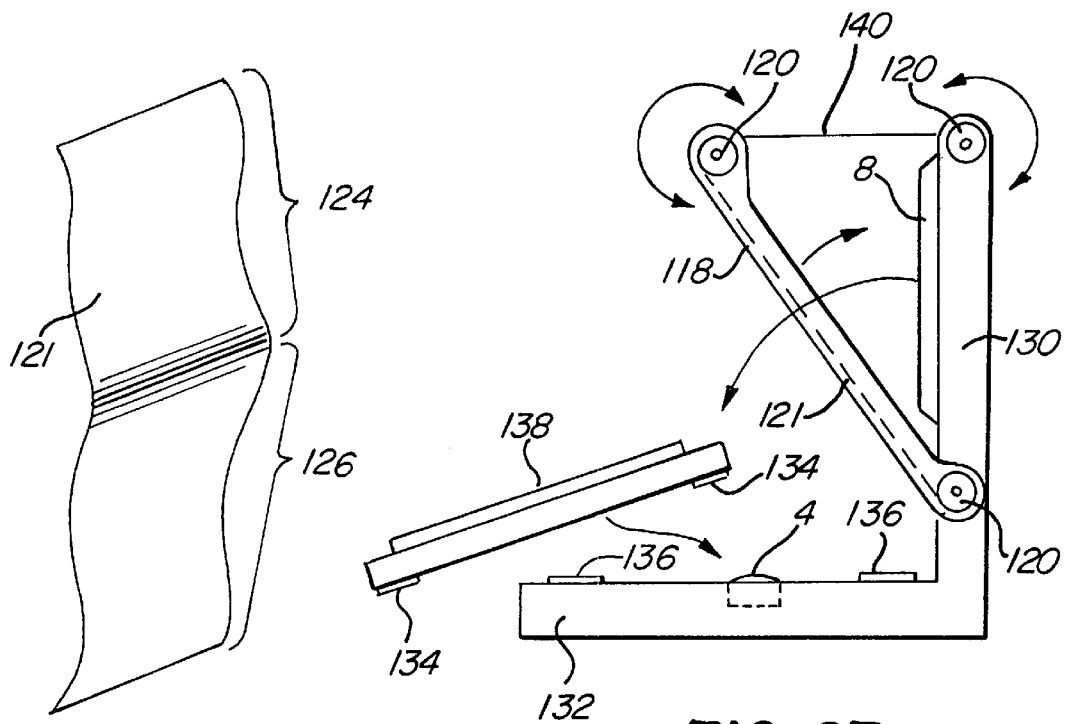
FIG. 26
FIG. 27

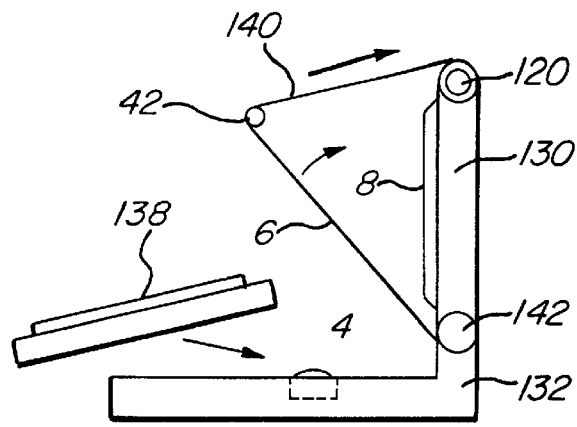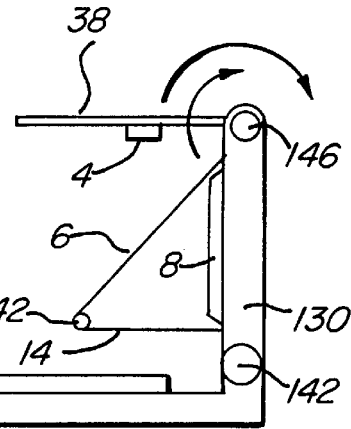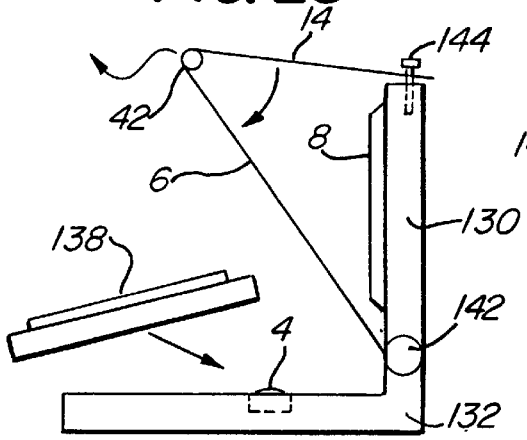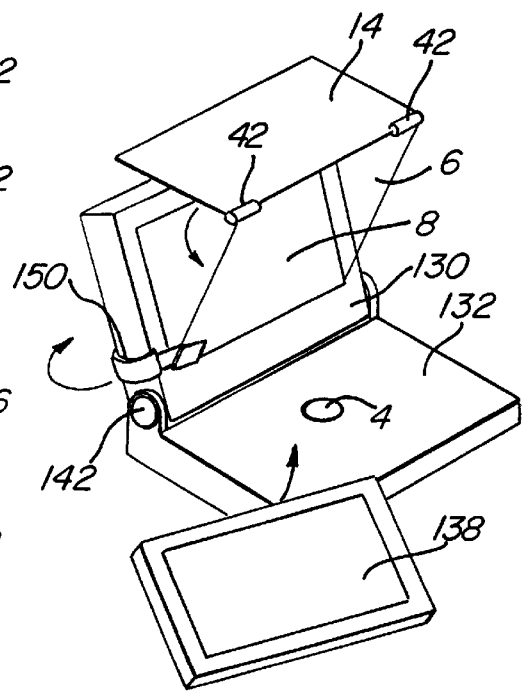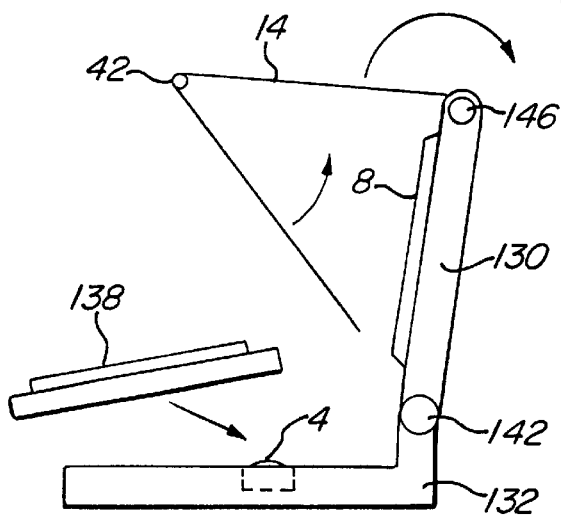

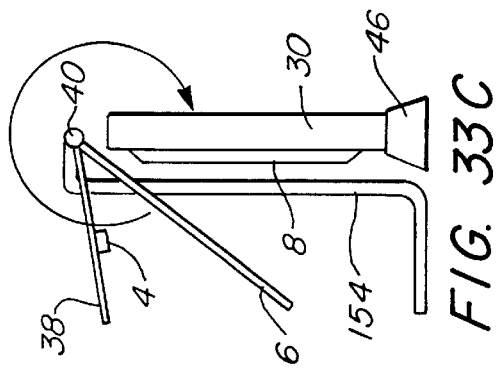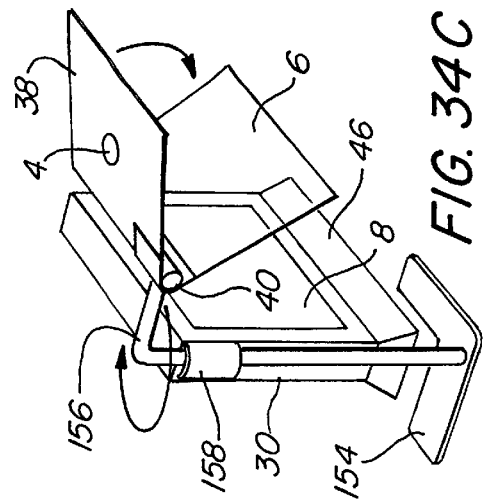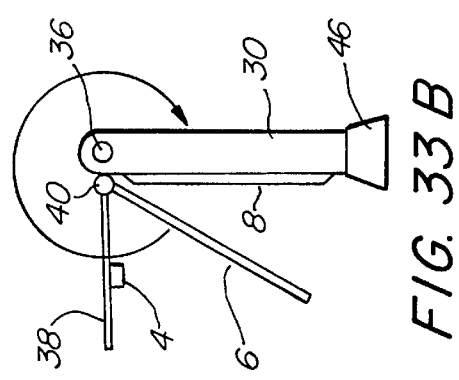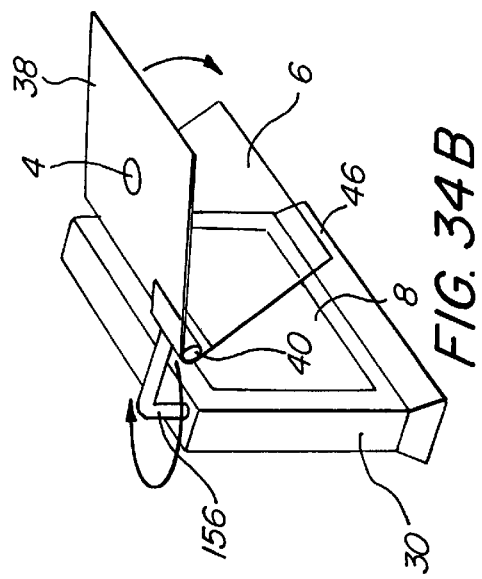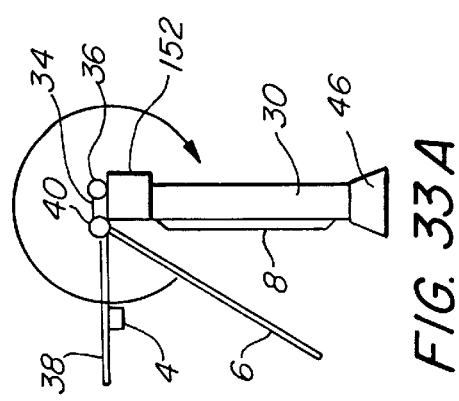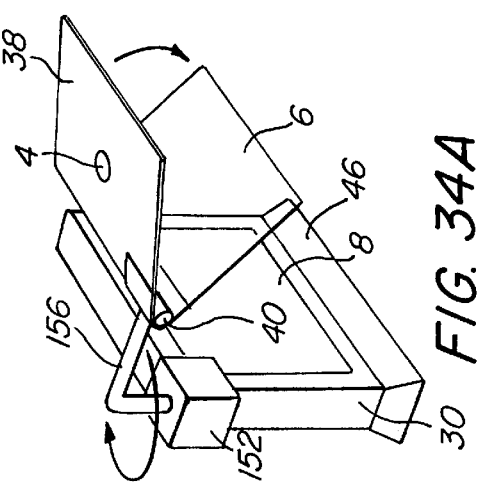

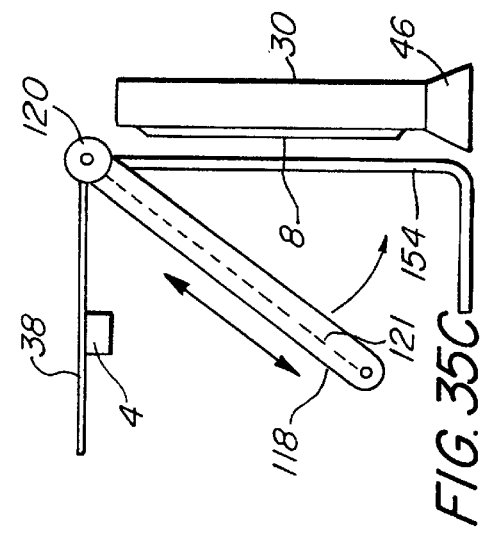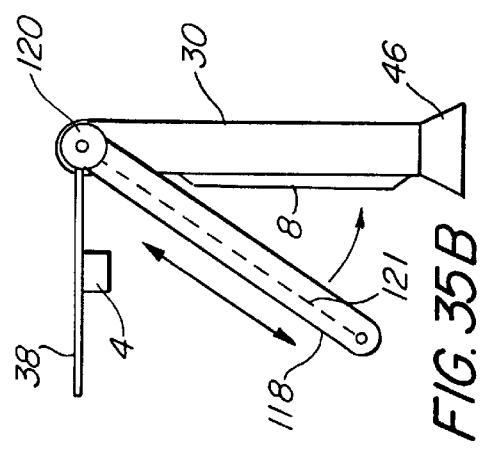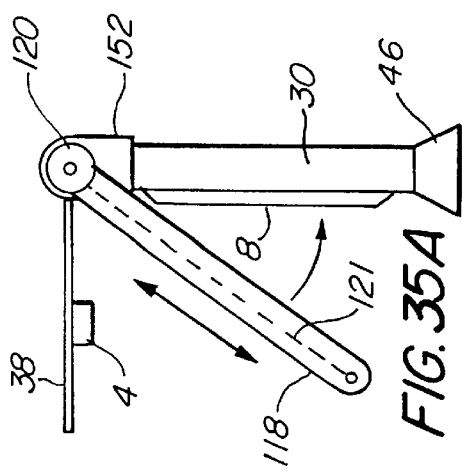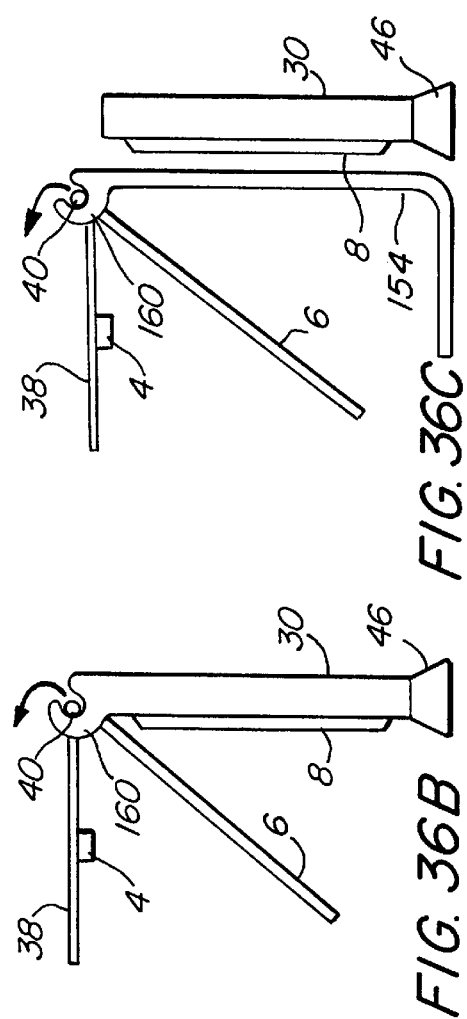

FOLDABLE EYE CONTACT COMPONENTS FOR A DUAL MODE DISPLAY

The present application is a Continuation In Part of application Ser. No. 09/108,476, filed Jul. 1, 1998, which is a Continuation In Part of Ser. No. 08/530,880, filed on Sep. 20, 1995, and now issued as U.S. Pat. No. 5,777,665 which applications are hereby incorporated by reference into this application.

BACKGROUND OF THE INVENTION

1. Field of the Invention

The present invention concerns the field of equipment for video teleconferencing and, more specifically, an improved design for a terminal that allows eye contact between a local conferee and a remote conferee at a second terminal.

2. Description of Related Art

The use of partially silvered mirrors is well documented in the art for producing eye contact while desktop videoconferencing. Either the mirror reflects the display similar to a teleprompter with the camera behind the mirror or the mirror reflects the image of the conferee viewing the display through the mirror of which that reflection is captured by a camera. This later arrangement has been utilized in behavioral research studies in the form of closed circuit videoconferencing for more than twenty-five years. Prior art FIG. 1 illustrates such a common arrangement that has been used to enable eye contact between research participants where each participant has a similar terminal so both can enjoy an eye contact image of the other. Here the conferee peers through a partially silvered mirror 6 to a display screen 8 of a display 2. A camera 4 captures an image of the conferee from the reflection of a mirror 10 and the partially silvered mirror 6 of which the captured motion images are transmitted to a distant terminal. A contrast shield 14 and a reflection shield 12 ensures unwanted ambient light does not strike the partially silvered mirror 6. This optical configuration when retrofitted to an existing display adds considerable bulk and prevents direct access to the display screen. A housing (not shown) usually includes all the eye contact components fixed so that they do not lose alignment. Numerous methods over the years have been utilized to attach the housing to the display and even repositioning the housing above the display 2.

Rather than removing the optics from the front of the display screen 8 prior art FIG. 2 illustrates the disclosure of the use of image blocking film as seen FIG. 17 in U.S. Pat. No. 5,777,665 in which the protrusion of the partially silvered mirror 6 is angled at around 30 degrees instead of the usual 45 degrees. The image blocking film 16 permits the camera 4 to be aimed directly toward the display screen without light from the display affecting the reflectivity of the partially silvered mirror 6. The contrast shield 14 ensures ambient light does not reduce the reflectivity of the partially silvered mirror 6. The reflection shield 12 ensures the desk and keyboard are not reflected over the display screen 8 and thereby disrupting the quality of the image. While this approach works substantially as designed, the protrusion of the beamsplitter 6 still awkwardly interferes with the normal use of the display screen 8, especially for touch screen applications.

A retractable devise has been proposed as illustrated in prior art FIG. 3 which is documented in U.S. Pat. No. 5,666,153 to Copeland attempts to reposition the partially silvered mirror 6 by removing it from the front of the display screen 8 and storing it above the display 2. The device, as illustrated and described, is designed for the depth of a CRT monitor of which the partially silvered mirror 6 tilts upward with less than ¼ of a revolution by a hinge 26 upon a retracting camera hood 18. Opposite the camera 4 on the other side of the partially silvered mirror is the contrast shield 14 which assures ambient light does not interfere with the reflectivity of the partially silvered mirror 6. The retracting camera hood 18 retracts with a sliding motion upon a track 20 so that the entire optics from the front of the display screen 8 lay on top of the display 2. The track 20 is clamped in place by pressure clamps 22 and 24. The drawbacks to this "mounted" device, however, are numerous. The track device is a cumbersome element which even when retracted still appears bulky and awkward-looking which is a distraction in an office setting. Still further, the retracting slide mechanism itself adds expense to the construction of the device and does not readily clamp upon the new organic monitor housing designs enjoyed by millions of consumers. Lastly, and most significantly, the retracting slide mechanism is not transferable to flat panel displays. In fact, if adapted with significant modifications to flat panel displays, the flat panel display will no longer be flat but be 14 to 18 inches deep with the eye contact optics suspended over the desktop horizontally.

OBJECTS AND SUMMARY OF THE INVENTION

It is an object of the present invention to provide a uniquely configured videoconferencing eye contact folded optic apparatus that does not require the use of a bulky retracting slide mechanism and can be readily affixed to both CRTs and flat panel display monitors for the desktop.

It is another object of the present invention to provide a uniquely configured eye contact folded optic apparatus that does not require the use of a bulky retracting slide mechanism and is built in as a part of a CRT or flat panel display.

It is a further object of the present invention to mount the eye contact folded optic apparatus on a separate stand with no need to be retrofitted to an existing computer monitor.

It is still a further object of the present invention to provide a uniquely configured eye contact folded optic apparatus that when folded is parallel to the display screen similar to a glare guard.

It is still a further object of the present invention to provide an eye contact folded optic apparatus that can be removed for safe and compact storage with all the optic components laying flat upon one another without the additional bulk of a retracting slide mechanism.

It is still a further object of the present invention to adapt a portable computer for dual mode use.

It is still a further object of the present invention to project by means of light amplification the display screen of a portable computer.

Lastly, it is an object of the present invention to capture an eye contact image through a rear projection screen configured with a clear focal point range and a diffused focal point range.

The present invention permits a dual mode use of a display screen of which in one mode the display screen is accessible and in the second mode has placed in front of the display screen eye contact components. The invention utilizes a uniquely hinged folded eye contact component apparatus which permits in the major embodiment of the present invention all of the eye contact components including the partially silvered mirror to fold with more than a one-half rotational turn entirely over to the back side of the flat panel display completely out of view. The folded eye contact components are attachable to existing flat panel displays and also are illustrated built in as a part of the flat panel housing. The same hinged folding function is also demonstrated as being suspended separate from the monitor so that no attaching to the display is required. Additional embodiments include adaptations for portable computers, flexible partially silvered mirrors that can be rolled up as well as other unique embodiments.

BRIEF DESCRIPTION OF THE DRAWINGS

The objects and features of the present invention, which are believed to be novel are set forth with particularity in the appended claims. The present invention, both as to organization and manner of operation, together with further objects and advantages, may best be understood by reference to the following description taken in connection with the accompanying drawings.

FIG. 17 illustrates folded eye contact components which are detachable for compact and safe storage;

FIG. 18 illustrates eye contact components folded upon one another and detached from the display;

FIG. 25 illustrates a flexible and rollable partially silvered mirror configurations;

FIG. 26 illustrates a two section flexible partially silvered mirror;

FIG. 27 illustrates a portable computer with the a flexible partially silvered mirror;

FIG. 28 illustrates a portable computer with a partially silvered mirror that is intended to be viewed though in two modes of use;

FIG. 29 illustrates a portable computer with detachable and foldable eye contact components;

FIG. 30 illustrates a portable computer with eye contact components that fold over to the back of the display;

FIG. 31 illustrates a portable computer with eye contact components that swivel to the side;

FIG. 32 illustrates a portable computer with an optical arrangement that aims the camera downward;

FIG. 33 A–C illustrates three folding configurations;

FIG. 34 A–C illustrates three swivel configurations;

FIG. 35 A–C illustrates three rollable configurations;

FIG. 36 A–C illustrates three detachable configurations;

DETAILED DESCRIPTION OF THE FOLDABLE EYE CONTACT COMPONENTS FOR A DUAL MODE DISPLAY PRESENT INVENTION

Figure 1:
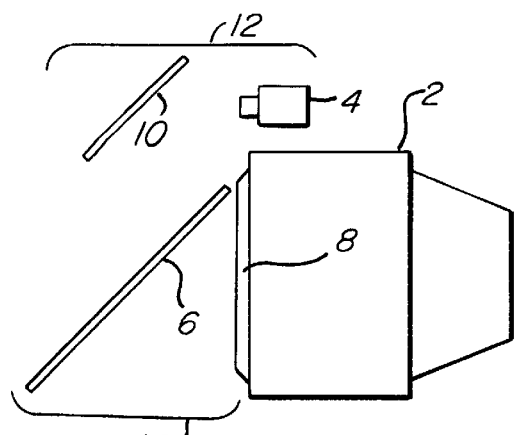
FIG. 1 illustrates a prior art eye contact display which has a removable optic housing.
Figure 3:
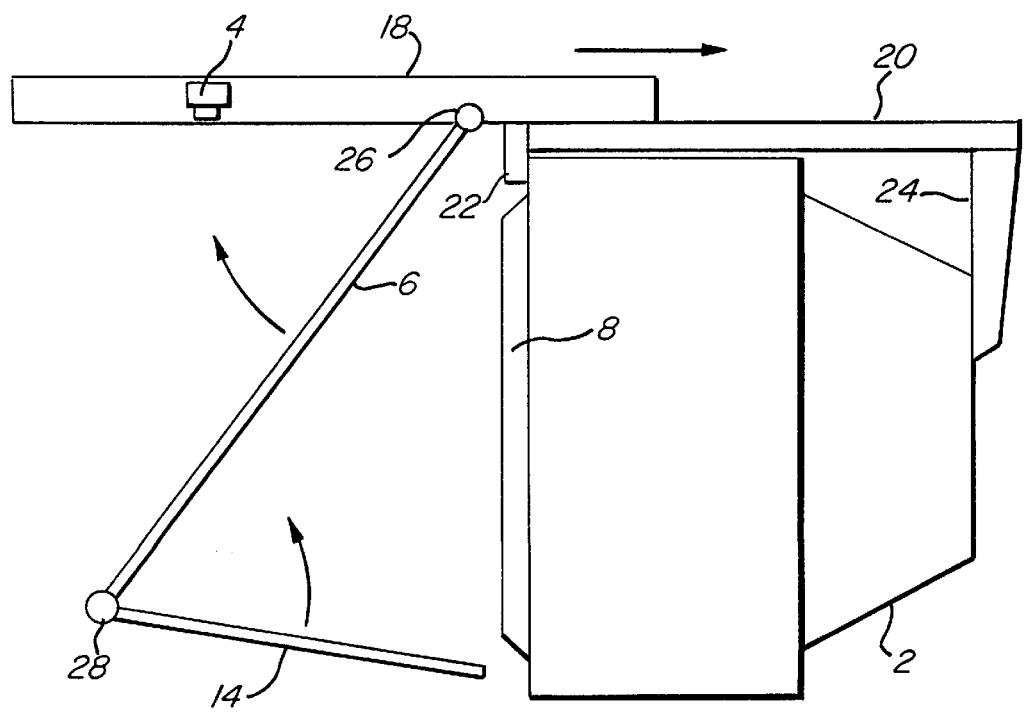
FIG. 3 illustrates a prior art eye contact display with a retracting slide mechanism.

The present invention is a significant advancement in the art so that the protrusion of the eye contact components which include the partially silvered mirror 6, the camera 4, the contrast shield 14, and the reflection shield 12 (see prior art FIG. 1) can be eliminated by being removed away from the front surface of the display screen 8. Hence two modes of use are intended for the display screen. One mode allows direct access to the screen for such applications as touch screen controls. The other mode permits the eye contact optics to be utilized in front of the display screen 8 so that an eye contact image can be captured of the conferee for transmission to a distant terminal. Preferably that distant terminal will as well have an eye contact display so that all conference participants can enjoy natural conversation. The prior art systems are bulky and awkward which makes the removing and retrieving of the eye contact optics a cumbersome task and the prior art systems even when removed from the display screen appear like bulky contraptions. Most importantly, the prior art systems did not take into account the mass consumer base that will soon enjoy flat panel displays on their desktop due to their predicted dramatic reduction in price. Millions of consumers will have flat panel displays without an eye contact feature and the present invention is primarily intended to provided an eye contact optical system for these flat panel displays that can be easily folded away and can be completely unobtrusive from the viewer's perspective. The same folded methods are also adaptable to existing CRT monitors which do not use a retracting slide mechanism as demonstrated in prior art FIG. 3.

Figure 4:
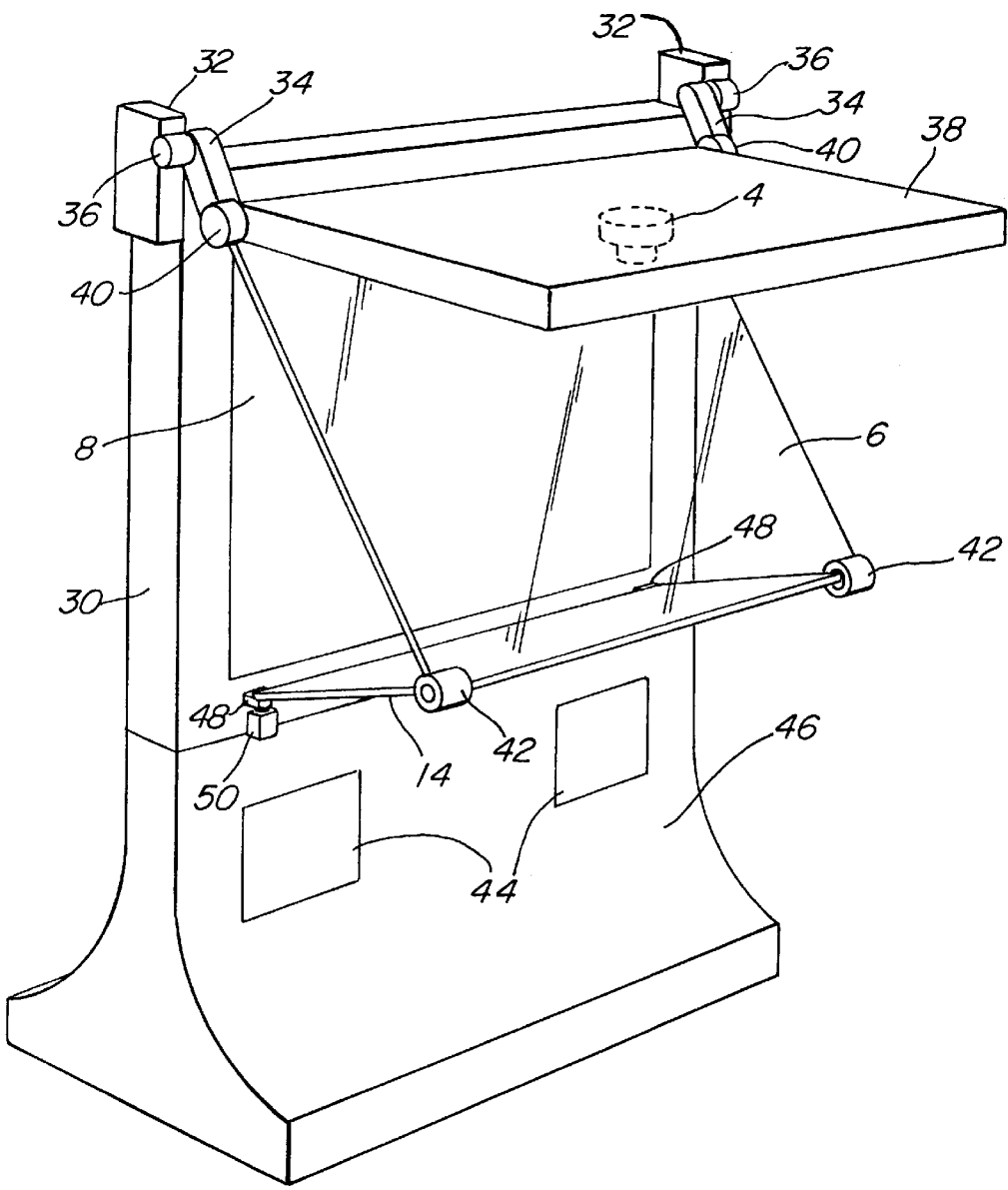
FIG. 4 illustrates the present invention with a hinged folded optic system in an eye contact mode.
Figure 5:
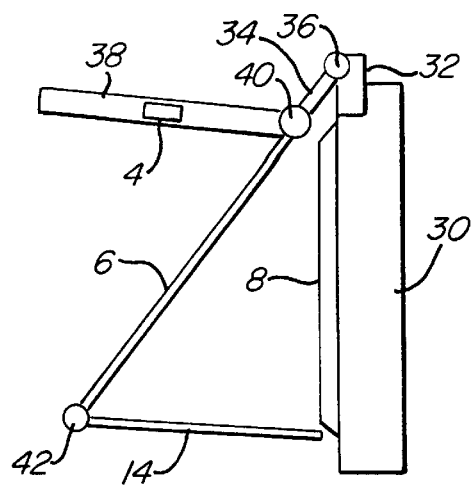
FIG. 5 illustrates is a side view of FIG. 4 folded open.
Figure 6:
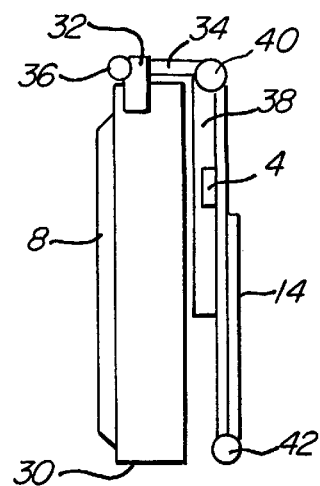
FIG. 6 illustrates the folded mode of FIG. 4 where the optic components are concealed upon the back side of the flat panel display.

FIG. 4 illustrates the preferred embodiment of the present invention. A flat panel display 30 is mounted as a part of a table stand 46 with built-in speakers 44. The eye contact optical components are mounted to the display by a pair of hinged attachment sections 32 at either side of the flat panel monitor 30. Stiff hinge 36 is attached to section 32 and to an extension post 34. Extension post 34 is attached to stiff component hinge 40 which holds in place a camera housing shield 38 and the partially silvered mirror 6. A contrast shield hinge 42 holds the contrast shield 14 in proper position. A rubber bumper 48 protects the flat panel 30 from scratches and nicks. An optional shield ledge 50 may be used to ensure proper position of the contrast shield 14. The camera 4 captures a reflection from the partially silvered mirror 6 of the conferee while the conferee views the image on the display screen 8. Typically the partially silvered mirror 6 is angled from the display screen 8 at 45 degrees but can be between anywhere from 30 and 60 degrees. FIG. 5 illustrates a side view of FIG. 4 with the eye contact optics opened for a videoconference. FIG. 6 illustrates the configuration of FIGS. 4 and 5 with the eye contact optics folded by the use of hinges 36, 40, and 42. The entire eye contact optics including the camera are concealed behind the flat panel 30 and have been rotated more than half from being positioned in front of the display screen 8. Most importantly, the flat panel is still flat. The folded eye contact optics adds a minimal depth to the apparent thickness of the flat panel display 30.

The camera housing shield 38 and the contrast shield 14 essentially serve the same function of blocking unwanted ambient light from striking the partially silvered mirror 6. Without the camera housing shield 38 ambient light such as ceiling lights would be reflected upon the partially silvered mirror 6 and be a visual irritant when the conferee observes the viewing screen 8. Likewise, without the contrast shield 14 ambient light would reduce the reflectivity of the partially silvered mirror 6 from the perspective of the camera 4 which then the camera 4 would capture a poorly defined image of the conferee.

The construction of the device is primarily plastic injection molding with metal inserts for the friction/stiff hinges which use polyethylene washers tightened within the hinged metal parts to the desired resistance. The partially silvered mirror 6 is preferably coated upon a ⅛ inch or less substrate to eliminate secondary reflection on the back side of the glass. Antireflective coatings are applied as well to help eliminate secondary reflections. Chemically hardened glass is preferable, which, if used, can reduce the thickness of the substrate to 1/16 of an inch without sacrificing glass strength and in turn reduces secondary reflections. Non-conductive materials are used to reduce the attraction of dust. The camera selected is a micro-camera common to the surveillance industry.

Figure 7:
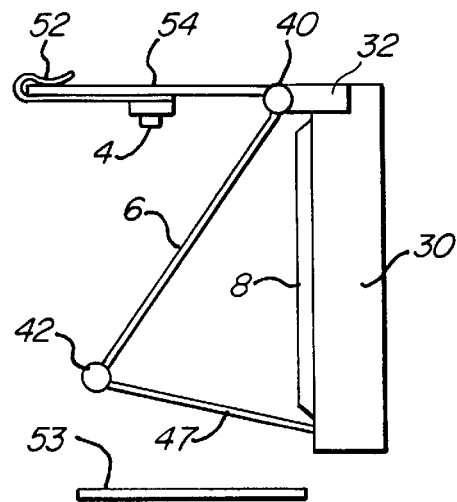
FIG. 7 illustrates a partially silvered mirror that folds parallel to the display with a detachable camera.
Figure 8:
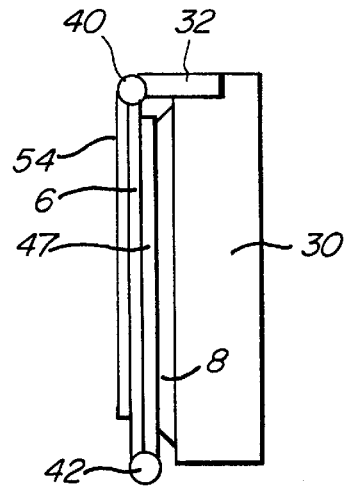
FIG. 8 illustrates the folded mode of FIG. 7 where the conferee views the display through the partially silvered mirror and optionally the contrast shield and the reflection shield.

Another unique embodiment of the present invention is seen in FIG. 7 where the partially silvered mirror 6 is folded flat upon the display screen 8 when not in use for eye contact videoconferencing. Likewise, a neutral density ambient light shield 54 and a neutral density ambient contrast shield 47 are folded upon the partially silvered mirror 6 as seen in FIG. 8. When folded as seen in FIG. 8, the eye contact optics appear as a typical glare guard common on displays. The neutral density ambient light shield 54 and the neutral density contrast shield 47 are transparent so that the display screen 8 can be seen through them. Also, the neutral density filters are substantially tinted to block out a substantial amount of ambient light and serve as a contrast element when unfolded as seen in FIG. 7. The neutral density filters as well serve to eliminate in part the reflectivity of the partially silvered mirror 6 when laid upon one another against the display screen 8 in FIG. 8. Another method to reduce the excessive reflectivity of the partially silvered mirror 8 when laid against the display screen 8 is to select optical coatings that have various degrees of reflectivity depending upon the angle of view. Ideally for the embodiment of FIGS. 7 and 8, the partially silvered mirror 6 is most reflective at an angle around 45 degrees and least reflective when parallel to the display screen 8 and the conferee. The camera 4 in FIG. 7 is mounted to a clip 52 which clips to the neutral density ambient light shield 54 and is removed with the camera 4 when the neutral density ambient light shield 54 is laid against the display screen 8. The neutral density ambient light shield 54 and the neutral density contrast shield 47 may also be constructed out of a shuttered substrate such as a liquid crystal panel that can shift upon selection from a transparent mode for use in FIG. 8 to an opaque mode for use when the eye contact optics are unfolded as seen in FIG. 7. The neutral density ambient light shield 54 and the neutral density contrast shield 47 need not necessarily be neutral density filters so long as they can be both clear in one mode of use and block light in the other mode of use. The camera 4 can be aimed through a hole in the neutral density ambient light shield 54 and not need the clip 52 for mounting (not Shown). Any mounting method of the camera 4 can be used within the scope of the present invention.

Figure 2:
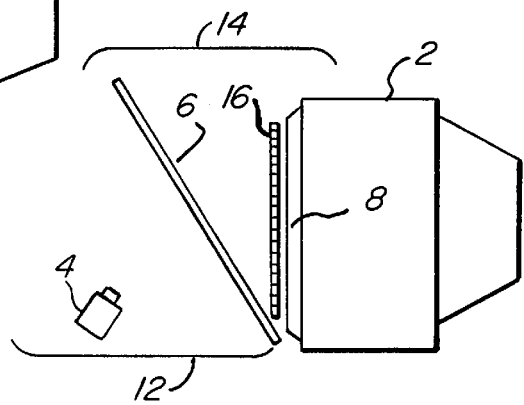
FIG. 2 illustrates a prior art eye contact system that uses image blocking film that enables reduction of the protrusion of the partially silvered mirror.
Figure 9:
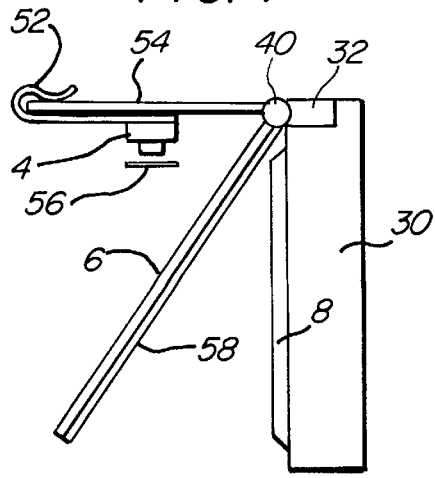
FIG. 9 illustrates the elimination of the contrast shield by deploying polarizers.
Figure 10:
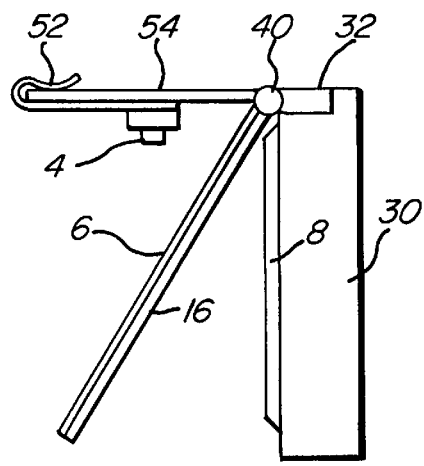
FIG. 10 illustrates the elimination of the contrast shield by deploying image blocking film.

Applicable to all the configurations of the present invention it may be desirable to eliminate the contrast shield 14 or the neutral density contrast shield 47 in order to increase the compactness of the eye contact optics. FIG. 7 illustrates the alternative use of a separate contrast shield 53 which would then eliminate the need for the contrast shield 14 and the neutral density contrast shield 47. The separate contrast shield 53 can be simply a piece of black velvet or black paint plastic that rest on the desktop or is built into the stand for the display (all not shown). It may also fold out from the display like an accordion or be stretched fabric (not shown). FIG. 9 illustrates a method to completely eliminate the contrast shield 14 and neutral density contrast shield 47 by deploying a polarizer 56 in front of the camera 4 and a second sheet polarizer over the partially silvered mirror 6. By doing so, no ambient light can interfere with the reflectivity of the partially silvered mirror 6. FIG. 10 illustrates the same function but with the use of image blocking film in which the conferee peers through like a venetian blind. The functional use of both polarizers and the image blocking film in this situation is not to reduce the protrusion of the beamsplitter as seen in prior art FIG. 2 where the polarizers (not shown) and image blocking film are utilized solely to increase contrast by eliminating light emanated from the display screen 8. The prior art FIG. 2 is clearly intended to eliminate light from the display screen 8 when the camera 4 is aimed toward the display screen 8 and not to remove the contrasts shield 14 and to reduce the number of eye contact components.

Figure 11:
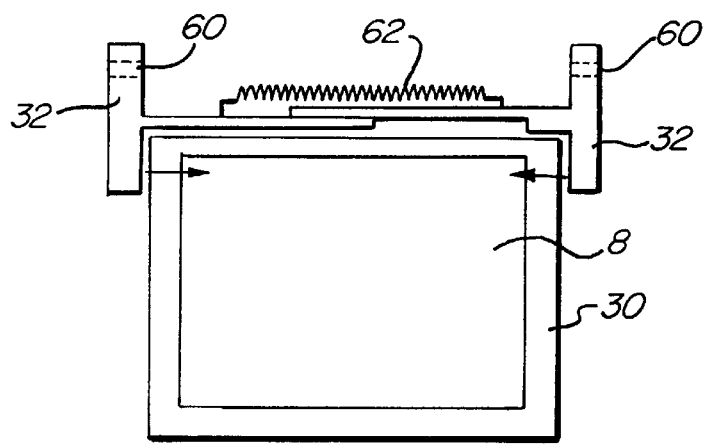
FIG. 11 illustrates a spring loaded attachment section.
Figure 12:
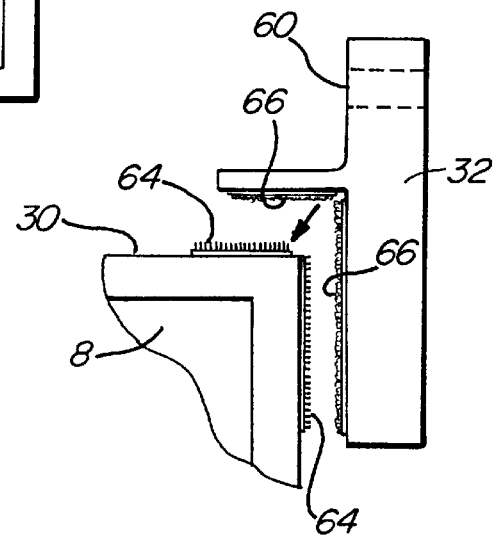
FIG. 12 illustrates an attachment section that utilizes a hook and loop fastener.
Figure 14:
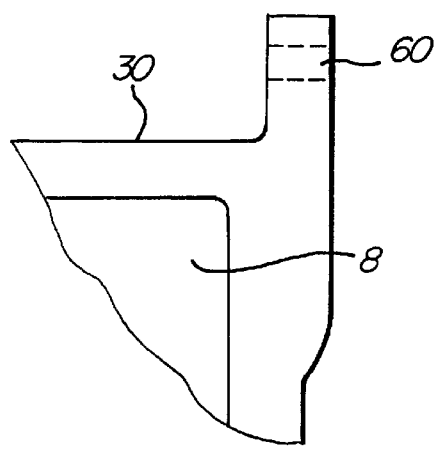
FIG. 14 illustrates an attachment section that is built in as a part of the display housing.
Figure 13:
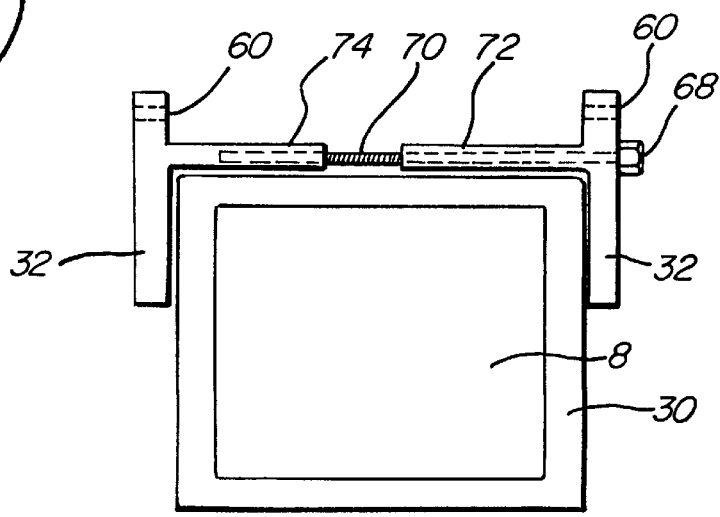
FIG. 13 illustrates an attachment section that utilizes a knob with a long bolt for tightening.

The attachment sections 32 can be attached in one of several methods to achieve a stable device that will enable the eye contact optics to be folded. FIG. 11 illustrates a spring loaded pressure system with spring 62 that pulls the attachment sections 32 against the flat panel display 30. A hinge hole 60 is the connection point for the eye contact components and parts to the attachment section 32. FIG. 12 illustrates the use of a hook 64 and loop 66 fastener to attach the attachment sections 32 to the flat panel 30. FIG. 13 illustrates a long bolt 70 which screws into receptacle 74. The long bolt 70 passes through sleeve 72 and is attached to a knob 68. The attachment sections 32 are tightened into the flat panel display 30 with a pressure fit by turning the knob 68. Lastly, it is a significant aspect of the present invention that the folded optic components as described and are permanently affixed or, at least the attachment sections 32, to the flat panel display 30. For example, FIG. 14 illustrates the attachment sections 32 built into as a part of the flat panel 30.

Figure 15:
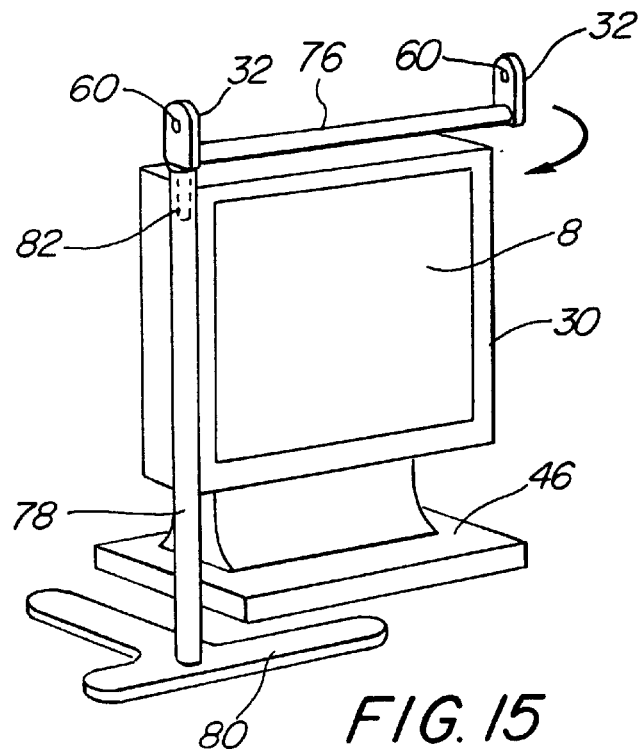
FIG. 15 illustrates a stand that can suspend the eye contact optics in front of the display screen.
Figure 16:
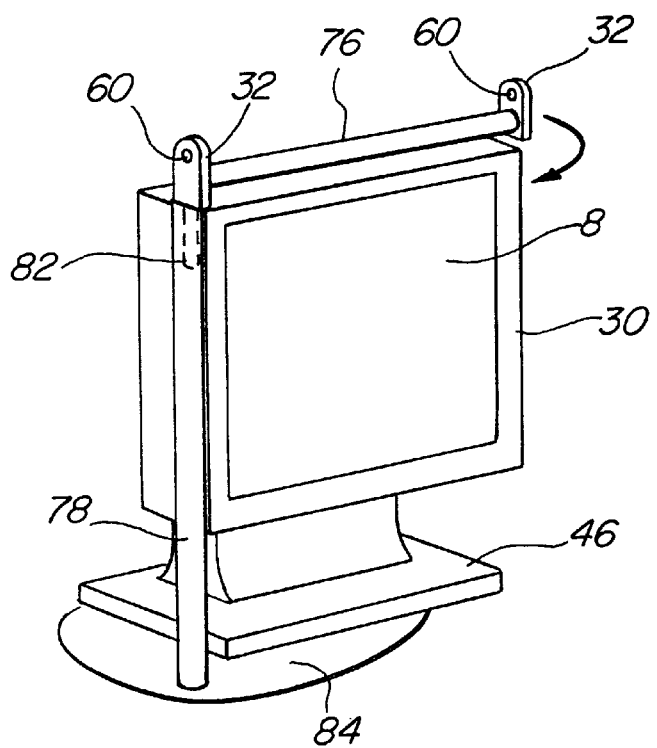
FIG. 16 illustrates a stand which utilizes the weight of the display to remain upright.

FIG. 15 illustrates another significant configuration of the present invention in which the foldable eye contact components are not mounted directly to the display but are rather suspended by a rod 78 and a free stand 80 serving as a supporting structure. This embodiment permits the present invention to be utilized with a variety of shaped display housings that otherwise would be frustrating to attach to. The attachment sections 32 are connected by a cross beam 76 which are connected to the rod 78 by swivel rod 82 inside a bored hole in the rod 78 to create a rotational hinged movement. This configuration not only allows any of the foldable eye contact components as described in this invention to be suspended in front of the display screen 8 without being physically attached to the flat panel 30 but also permits the foldable eye contact components to swivel to the side of the flat panel 30 for an alternative storage dock. The same swivel mechanism will also permit the foldable eye contact components to swivel to the back of the flat panel 30 completely out of view from the operator's perspective (not shown). FIG. 16 illustrates the same suspension system, but instead of using the free stand 80, the rod 78 is attached to a flat plate 84 which is held in place by the weight of the flat panel display 30 and its table stand 46. The suspension systems of FIGS. 15 and 16 permit the same hinged folding characteristics as described for FIGS. 4–6 and FIGS. 7–10 as well as all adaptations of the embodiments described herein including those for CRTs. Those skilled in the art will appreciate the variations of the rod 78 and crossbeam 76 are within the scope of the present invention. Certainly, attractive formed plastic structures that support the attachment sections 32 from one or both sides will accomplish the intention of suspending the foldable eye contact components in front of the display screen 8.

Another significant aspect of the present invention is the foldable eye contact components are quickly removable from the front of the display screen 8 and the entire flat panel 30 and then stored folded closed as seen in FIG. 18 for safe and compact storage. FIG. 17 illustrates a stiff hook attachment sections 86 serving as suspension means and having an open slot of which a pin 87 attached to the stiff component hinge 40 slips into. As illustrated, the contrast shield 14 folds upon the partially silvered mirror 6 which in turn folds upon the camera housing shield 38. When folded, the components are lifted out of the open slot of the attachment sections 32. This removable feature can be incorporated into all the configurations described of the present invention. As described for FIGS. 11–14 the attachment sections 32 can be affixed to existing display or built integral to a display housing. This removable folded eye contact component bundle can also be suspended and not affixed directly to the display as described in FIGS. 15 and 16. When folded, the contrast shield 14 and the camera housing shield 38 protects both sides of the partially silvered mirror 6 from being scratched when in storage. Of course, the contrast shield 14 and the camera housing shield 38 can be designed to be an equal length as the partially silvered mirror 6 to fully protect it from being scratched essentially forming a case for the partially silvered mirror 6. Rather than attachment sections 32 hook and loop fasteners, plastic latches, and so on can be used to attach the folded eye contact components to the flat panel display 30.

Figure 19:
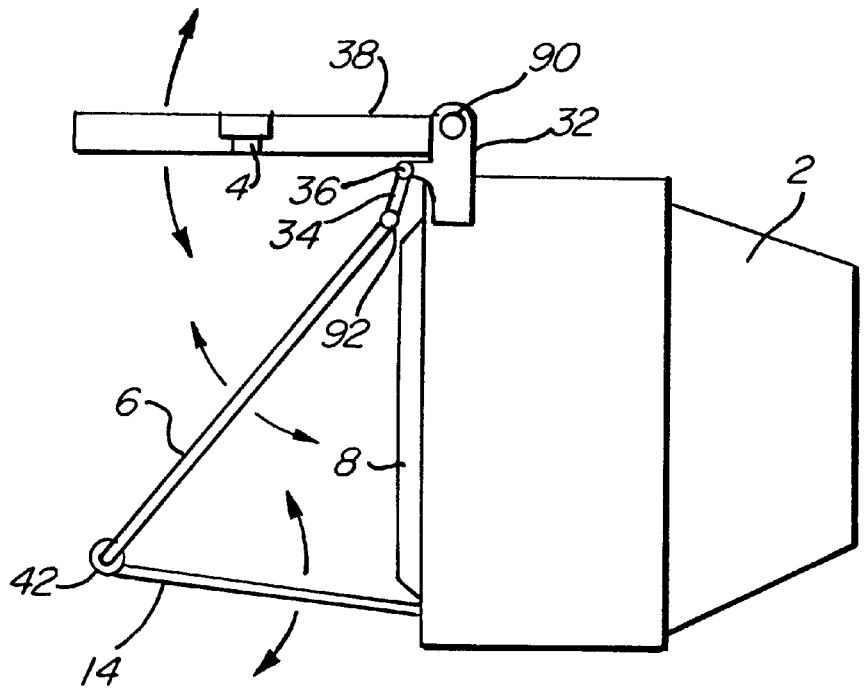
FIG. 19 illustrates folded eye contact mounted to a CRT.
Figure 20:
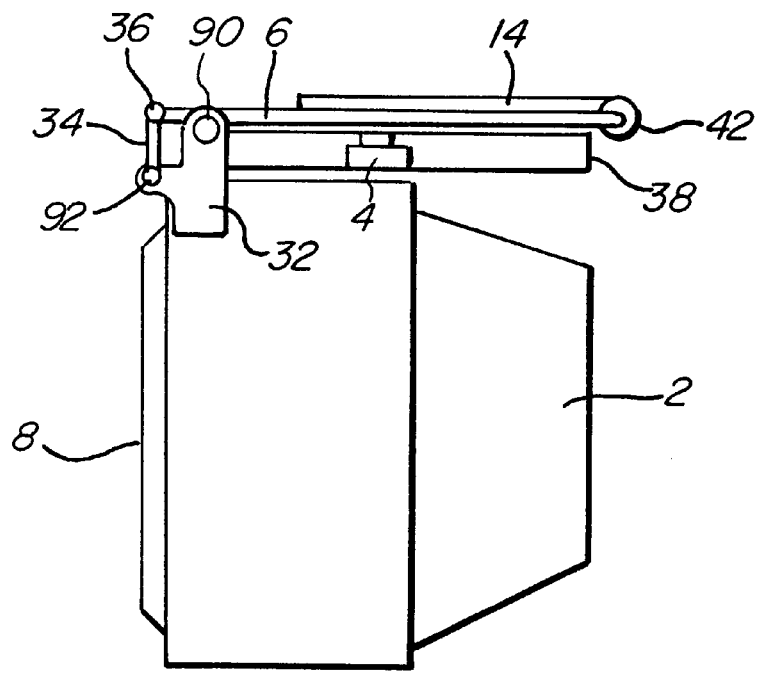
FIG. 20 illustrates the eye contact components of FIG. 19 in a folded mode above the CRT.

While the primary embodiments of the present invention are intended to create a foldable eye contact apparatus for flat panel displays, it is equally applicable to CRT and rear projection displays. FIG. 19 illustrates an embodiment of the present invention that permits all the eye contact components to be quickly folded over on top of the display 2. Round stiff hinge 90 is directly attached to the camera housing shield 38. A mirror hinge 92 in conjunction with the stiff hinge 36 and extension post 34 permits both the partially silvered mirror 6 and the contest shield 14 to fold as well on top of the display 2. FIG. 20 illustrates the folded mechanism on top of the display 2 so that direct access to the display screen 8 is possible.

Figure 21:
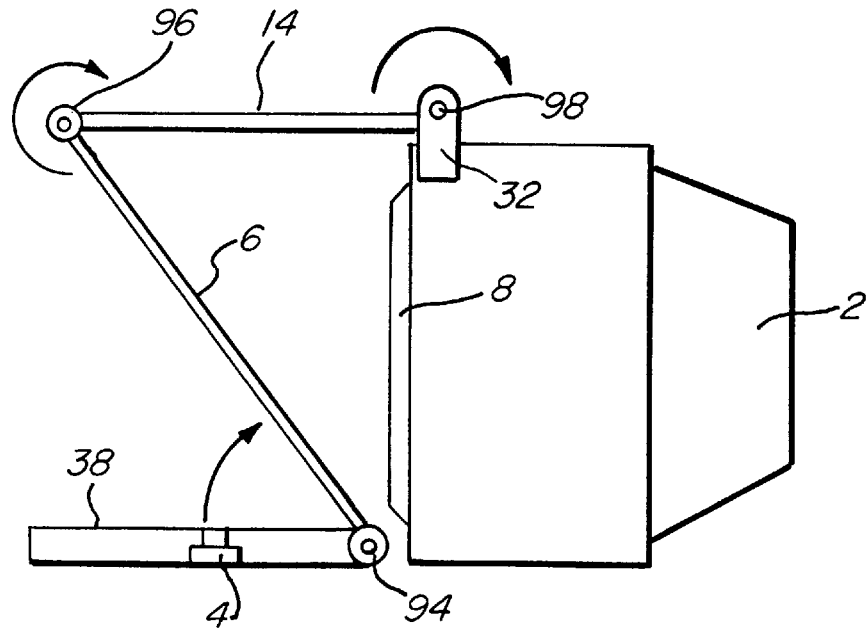
FIG. 21 illustrates a reverse configuration of the present invention with the camera aimed upward.
Figure 22:
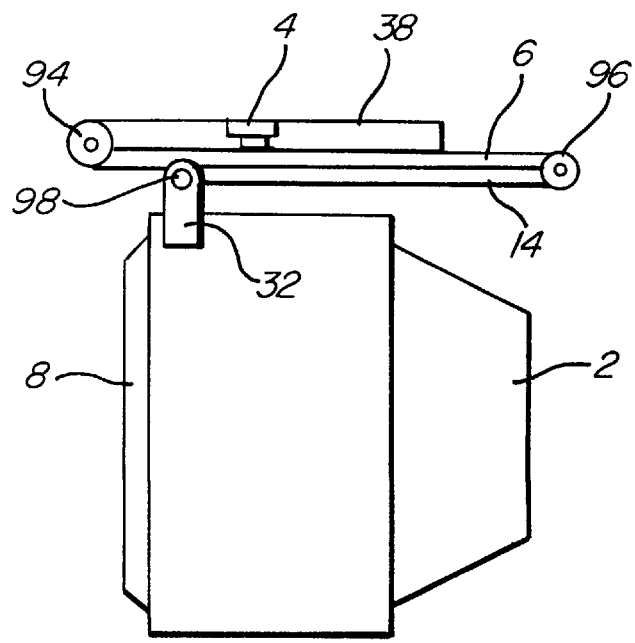
FIG. 22 illustrates the eye contact components of FIG. 21 folded above a CRT.

FIG. 21 illustrates the reverse eye contact component placement with the contrast shield 14 above and the camera housing shield 38 below. This reversed arrangement is applicable to all the embodiments of the present invention including those for flat panels. This arrangement is superior in certain lighting conditions where ceiling lights may be reflected onto the partially silvered mirror 6 when angled upward as with FIG. 4 and the other similar configurations described. This ceiling reflection problem is remedied by having extension platforms that extend beyond each side of the camera housing shield 38 (not shown) or reversing the optical arrangement partially silvered mirror 6 so it aims down toward the desk as seen in FIG. 21. Those skilled in the art will understand the mechanism illustrated is adaptable so that when used with the flat panel 30 the eye contact components can be folded to the back of the flat panel 30 as seen in FIG. 6. Likewise, for the embodiments of FIGS. 7–10 are applicable this reverse configuration and can be folded up parallel to the display screen 8 and appear similar to a glare guard. As seen in FIG. 21 a pressure hinge 98, a friction hinge 96 and a double friction hinge 94 all serve to fold the partially silvered mirror 6, the camera housing shield 38 and the contrast shield 14 quickly and compactly on top of the display 2 as seen in FIG. 22.

Figure 23:
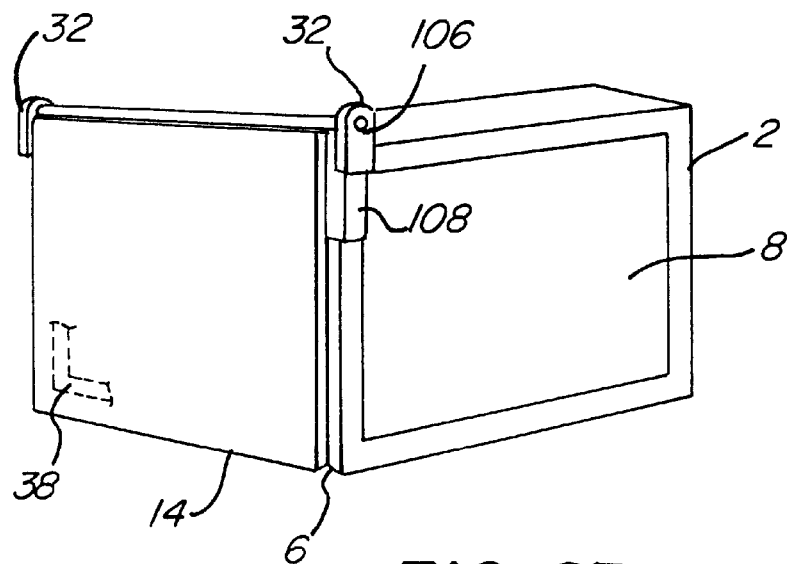
FIG. 23 illustrates folded eye contact components which are swiveled to a the side of the display.
Figure 24:
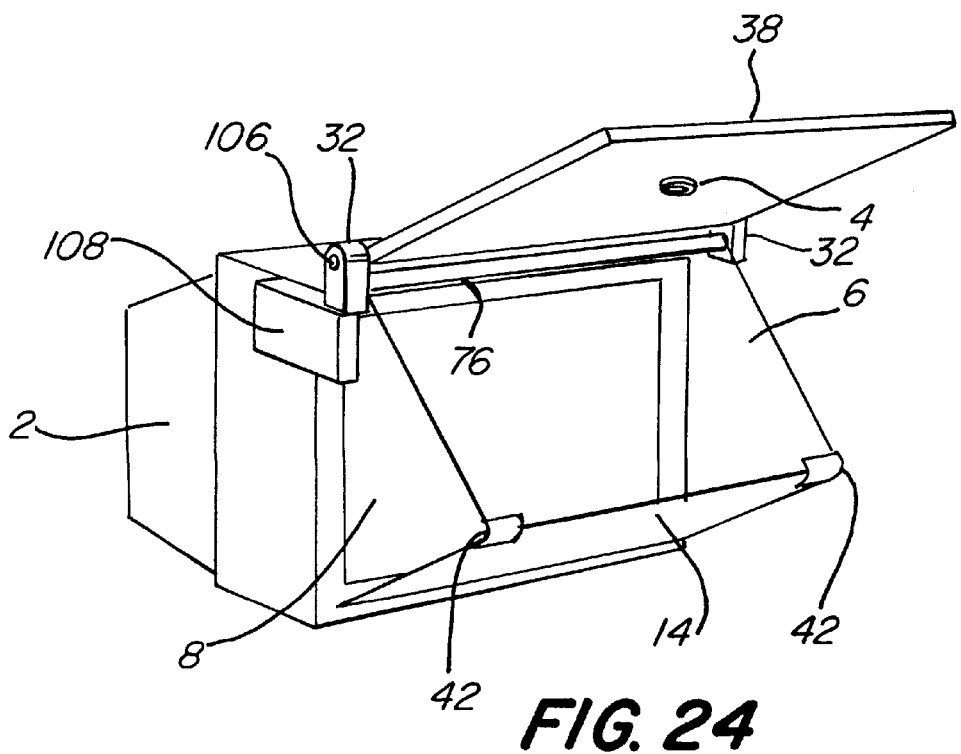
FIG. 24 illustrates the eye contact components of FIG. 23 opened and in front of the display screen.

Besides folding the eye contact components on top of the display 2 or for that matter the flat panel 30, the eye contact components can be swiveled with a rotational hinged movement to either to the left or right (FIG. 23) by a swivel connection 108 that has a rod (not shown) positioned in a bored hole (not shown) of the attachment sections 32. The cross bar 76 connects both attachment sections 32 which hold the eye contact components with a triple friction hinge 106. For details of operation see the description for FIGS. 15 and 16. As illustrated for FIGS. 23 and 24 the swivel mechanism 108 is attached or built as a part of the display 2 and flat panel 30 (not shown).

FIG. 25 illustrates another significant configuration of the present invention which utilizes a flexible partially silvered mirror 121 which can be rolled up or down by friction knobs 120. FIG. 26 illustrates the flexible partially silvered mirror 121 with two distinct section on the same substrate. Substrate section 124 is coated with a full beamsplitter coating maximum reflectivity and substrate section 126 is coated with either a lesser degree reflective coating, no coating or even an anti-reflective coating. Intentional section 126 is positioned in front the display screen 8 when roller housing 118 is parallel to the display screen 8. When used for eye contact videoconferencing the roller housing 118 is lowered and section 124 is rolled into position in front of the display screen 8. Of course a single roller configuration with a single friction knob 120 is possible in an alternate embodiment (not shown) in which the substrate section 124 retracts and pulled into place similar to a window shade. The flexible partially silvered mirror 121 can made of numerous materials but most simply can be mylar window film. Though FIG. 27 illustrates the camera aimed upward it can certainly be configured as seen in FIG. 4 aimed downward. Modifications and adaptations of various embodiments of the present invention can be integrated as apart of the flexible partially silvered mirror 121.

The present invention also is directly applicable to the being incorporated into portable computers. FIG. 27 illustrates the flexible partially silvered mirror built into a portable computer. A flexible ambient light shield 140 is also included and retracts by friction knob 120 attached to the portable display housing 130 so that the roller housing 118 can close upon the display 8. A keyboard 138 in this portable configuration is designed to be removed by a magnet 134 and a second magnet 136 to expose the camera 4 embedded with in a computer housing 132. FIG. 28 illustrates a portable computer where the partially silvered mirror folds upon and parallel to the display screen 8 as described for FIGS. 7–10. A common flat panel hinge is used to connect the portable display housing 130 to the computer housing 132. FIG. 29 illustrates a detachable and foldable ambient light shield 14 and partially silvered mirror 6 that can be removed from the portable computer for storage compact storage as explained in FIGS. 17 and 18. The ambient light shield is held in place by a pull pin 144. FIG. 30 illustrates the portable computer with a full rotational hinge 146 so that the ambient light shield 14 and the partially silvered mirror 6 can fold to the back of the portable display housing 130. FIG. 31 illustrates the portable computer with the small swivel hinge 150 so that the ambient light shield 14 and the partially silvered mirror 6 can swing to the side and behind the portable display housing 130. Alternatively all the configurations of FIGS. 27–31 can have a camera mounted above as seen in FIG. 32. Here the keyboard is built into a common keyboard/computer housing 148.

In summary and for clarification the unique eye contact configurations of the present invention are presented for classification and all represent a significant improvements over the prior art. FIGS. 33A–C illustrates the unique function of folding the partially silvered mirror over and even behind the flat panel display 30. FIG. 33A shows a configuration which is mountable by a generic mount 152 to the flat panel display 30. FIG. 33B shows a configuration that is built integral with the flat panel display 30 and FIG. 33C shows the configuration of using a separate stand 154.

FIGS. 34A–C illustrates the unique function of swiveling the partially silvered mirror 6 to the side and even behind the flat panel display 30. FIG. 33A illustrates a mountable swivel system with a swivel arm 156. FIGS. 34B illustrates a swivel mechanism built into the flat panel display 30 and FIG. 33C illustrates a swivel mechanism built into a separate stand with swivel arm 156 connected to stand tube 158.

FIGS. 35A–C illustrates the unique embodiment of the present invention with a flexible partially silvered mirror 121. FIG. 35A illustrates a mountable configuration, 35C illustrates a built integral configuration to the flat panel 30, and FIG. 35C illustrates the partially silvered mirror 121 attached to a separate stand.

FIGS. 36A–C illustrates another unique embodiment of the present invention in which the partially silvered mirror 6 and the ambient light shield 14 and the camera 4 can be detached and fold upon one another for compact storage without the addition of storing bulky mounting connections as described in FIGS. 17 and 18. FIG. 36A illustrates a quick release 160 attached to the flat panel 30 which allow the quick detaching of the partially silvered mirror 6, and the camera housing shield 38. FIG. 36B illustrates the quick release 160 built integral to the flat panel 30 and FIG. 36C illustrates quick release 160 built into the separate stand 154.

Figure 37A:
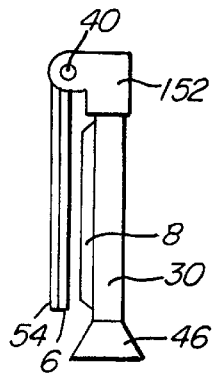
FIG. 37 A–C illustrates three parallel folding configurations.
Figure 37B:
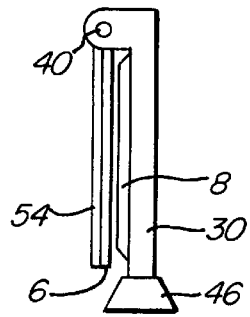
Figure 37C:
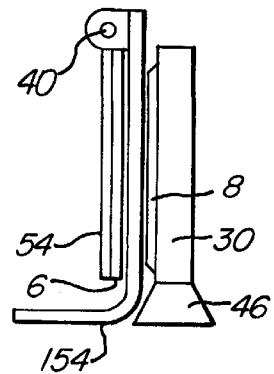

For classification the parallel to the display screen 8 embodiment of the present invention as described in FIGS. 7–10 is seen in FIGS. 37A–C. FIG. 37A is a mounted configuration, FIG. 37B is built integral to the flat panel display 30 and FIG. 37C illustrates a separate stand configuration. All FIGS. 33–37 can be configured in reverse, can include the ambient light shield 14 and are applicable to bulkier displays such as CRT monitors and rear projection monitors.

Figure 38:
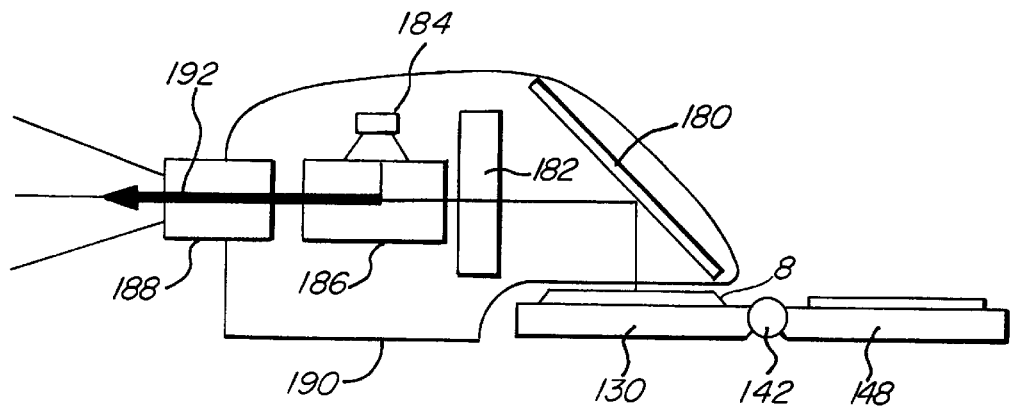
FIG. 38 illustrates a light amplifier system for projecting a note book computer screen.
Figure 39:
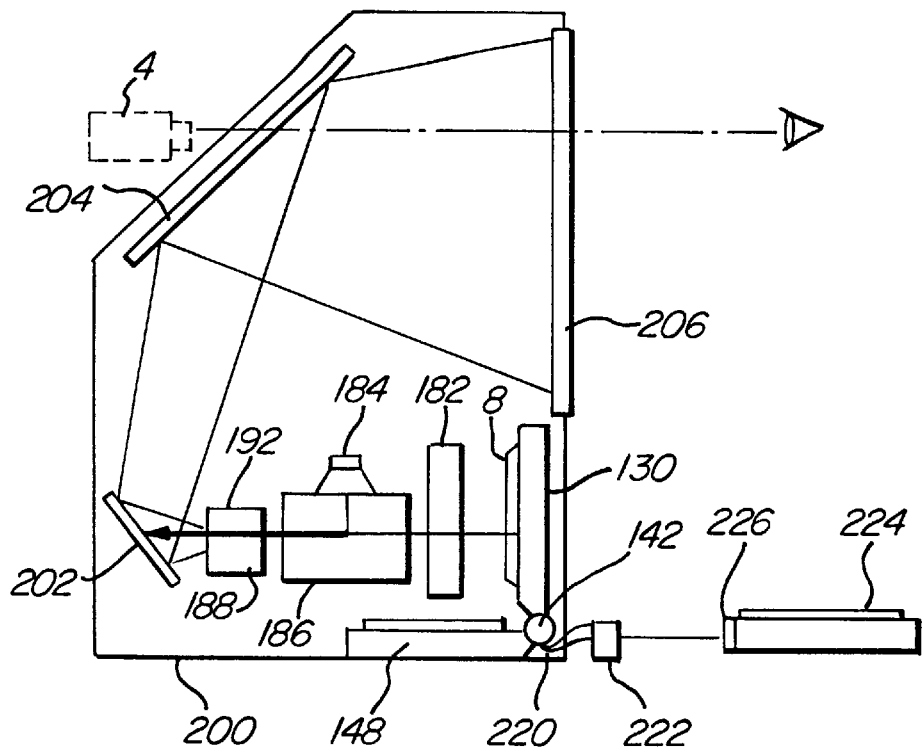
FIG. 39 illustrates a light amplifier system for projecting onto a rear screen a note book computer screen.

FIG. 38 illustrates a light amplification system 186 for projecting the display screen 8 of a portable computer. Projectors used for artist sketching purposes that project color photos on a wall are well known in the art. Certainly these simple projectors can as well project images from a display screen. However, the luminance of the projected images are so dim that they are useless for almost all presentational purposes. Today presenters expect projectors of ANSI lumen ratings of 700 or more. Simple sketching projectors can barely produce a visible image. A significant embodiment of the present invention is to utilize the screen from a portable computer as the imaging source for a projector and thereby eliminate the costly electronics and light valves included in portable and big screen projectors. FIG. 38 illustrates the use of the light amplification system 186 with a light source 184 to increase the luminous intensity of the display screen 8 and thereby produce a amplified projection beam 192. A rear optics 182 and a front optics 188 are illustrated for reference and any combination of optical lenses and components may be used for imaging purposes. For example the rear optics 182 may not be needed in some systems. Light amplification is currently being used in several projector systems and most notably by JVC Hughes of Carlsbad, Calif. which typically use photosensitive materials. All of the commercially available projectors inefficiently require at least one light valve (image source) and driver electronics unlike the present invention. The current invention as seen in FIG. 38 illustrates a portable housing 190 which includes an optional first surface mirror 180 to direct light from the display screen 8. The housing 190 is positioned over or alternatively in front of the display screen 8 (not shown) of the portable computer. Another embodiment of the present invention illustrates the light amplification system 186 within a rear projection housing 200 with a rear projection mirrors 202 and 204. Here the portable computer docks within the housing 200. Rear projection screen 206 is utilized to form the visible image from the amplified projection beam 192. Both configurations of FIGS. 38 and 39 may use from zero to as many mirrors as is necessary to orient the light path as desired. It is also preferred that the operator have access to the keyboard/computer housing 148 (not shown for the configuration of FIG. 39). It is still further preferred that the display screen 8 can be viewed directly and at the same time have its image utilized for projection. Lastly, an eye contact rear projection system can be deployed and integrated into the configuration of FIG. 39 by the addition of camera 4. A beamsplitter (not shown) in exchange for mirror 204 and an LCD shutter rear screen (not shown) replacing the rear projection screen 206 will enable eye contact videoconferencing. Optionally a IR sensor 222, or similar sensor, is connected to the keyboard/computer housing 148 and is responsive to a second IR sensor 226 connected to an external wireless keyboard 224 or other human interface hardware.

Figure 40:
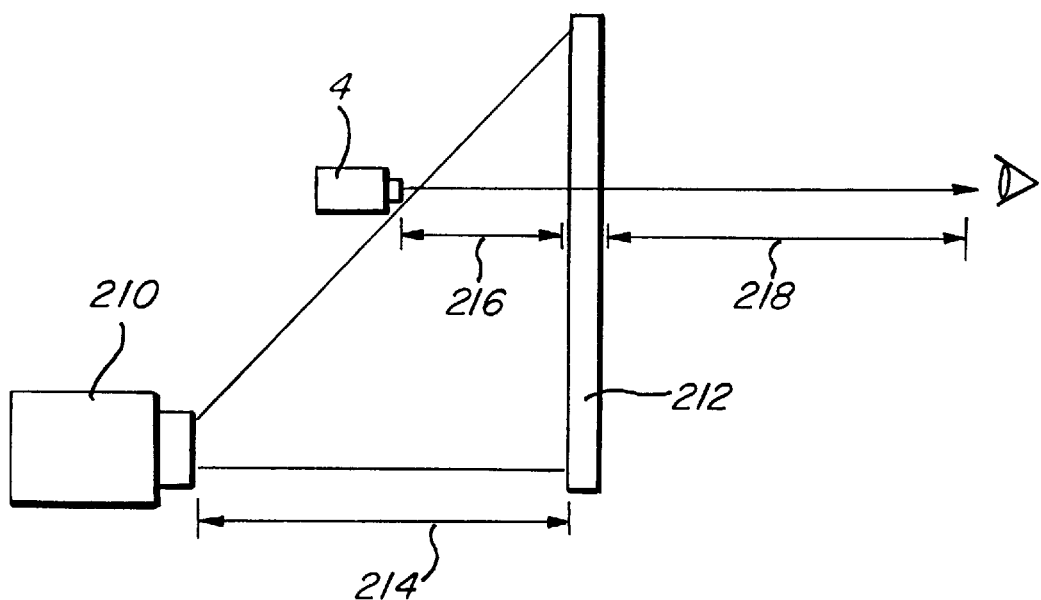
FIG. 40 illustrates a diffused/transparent rear projection eye contact screen.

It is still a further embodiment of the present invention to create a far improved rear projection eye contact screen over the well known LCD shutter rear screens and also polarized screens. The LCD shutter screens suffer from slow refresh rates due to being in a quickly flashing clear mode and diffused mode synchronized with the camera. Also, these LCD shutter rear screens suffer from poor clarity which affects the quality of camera image capturing. Polarized rear screens, such as lenticulated polarized screens, have proved to be costly to manufacture and as well have shown poor imaging results. FIG. 40 illustrates a unique embodiment of the present invention which utilizes a clear focal point rear screen 212. Camera 4 is positioned from the rear screen 212 at a distance 216. At this distance the clear focal point rear screen 212 is clear so that camera 4 can image through it to capture an eye contact image of the conferee observing the rear screen 212. This same screen, however, is diffused when observed at a distance 218. Corresponding the distance 218 is distance 214 which, for descriptive purposes, are the same distance. Hence a projector 210 will disperse an image upon the clear focal point rear screen 212 because it is actually positioned at a focal point, just as the observer, of which the rear screen 212 is diffused. While any material and optical system may be used that functions as described above with a clear focal point range and at a diffused focal point range it is preferred that a holographic, lenticulated, and/or lens substrate is custom fabricated to these functional specifications.

Additional components can be easily integrated to the present invention such as lights, microphones, speakers, pan/tilt remote controlled cameras, auto tracking cameras, additional mirrors, removable cameras for document imaging and so on. Also, image blocking film or polarizers can be included to reduce the protrusion of the partially silvered mirror 6 by aiming the camera directly toward the display screen 8. Antireflective coatings can be applied as needed to ensure the highest quality image displayed and captured. The display may operate both from a digital and analog source. Certainly consumers will ultimately determine the package of options included to the core eye contact technology. All of the embodiments and configurations of the present invention are intended to be integrated into numerous consumer products including portable computers, desktop computers, videophones and so on. All of the embodiments may mount the eye contact components within a housing that as well collapses, such as walls that are folded or are made of collapsible cloth. Additionally, all of the embodiments may be mounted to mechanisms that allow the display, the eye contact components or both to be raised or lowered for comfortable viewing. The display 8 may be 2-D or 3-D depending upon the particular application. Lastly, the partially silvered mirror 6 can either be plastic or glass. If glass it is preferably chemically hardened, dust repellent and hard coated to protect the metallic reflection coating.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than is specifically described herein.

What is claimed is:

1. A non-retracting dual position eye contact apparatus for mounting to an existing display monitor which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel mounted to the housing and utilized in a first position creating a reflection of a conferee for image capturing by a camera while that conferee observes the viewing screen through the transparent-reflective panel and in a second position permitting the conferee to observe the viewing screen directly without having to look through the transparent-reflective panel; and a transparent-reflective panel repositioning means which repositions the panel from the first position to the second position by one of flipping a bottom of the panel over a top of the panel so the panel may rest behind the viewing screen, by swiveling the panel to a side of the viewing screen, and rolling the panel upon itself away from the viewing screen being constructed of a flexible substrate.

2. The apparatus of claim 1 further comprising an ambient light shield utilized for blocking unwanted light from striking the transparent-reflective panel while the panel is in the first position and an ambient light shield repositioning means which repositions the shield to the panel's second position by one of flipping a bottom of the shield over a top of the shield so the shield may rest behind the viewing screen, by swiveling the shield to a side of the viewing screen, and rolling the shield upon itself being constructed of a flexible substrate.

3. The apparatus of claim 1 wherein the camera is built into the ambient light shield.

4. The apparatus of claim 1 wherein the housing is connected to a portable computer.

5. The apparatus of claim 1 further comprising a second ambient light shield hingedly attached to the transparent-reflective panel.

6. A non-retracting dual position eye contact apparatus which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel connectably fabricated as a part of the housing and utilized in a first position creating a reflection of a conferee for image capturing by a camera while that conferee observes the viewing screen through the transparent-reflective panel and in a second position permitting the conferee to observe the viewing screen directly without having to look through the transparent-reflective panel; and a transparent-reflective panel repositioning means which repositions the panel from the first position to the second position by one of flipping a bottom of the panel over a top of the panel so the panel may rest behind the viewing screen, by swiveling the panel to a side of the viewing screen, and rolling the panel upon itself away from the viewing screen being constructed of a flexible substrate.

7. The apparatus of claim 6 further comprising an ambient light shield utilized for blocking unwanted light from striking the transparent-reflective panel while the panel is in the first position and an ambient light shield repositioning means which repositions the shield to the panel's second position by one of flipping a bottom of the shield over a top of the shield so the shield may rest behind the viewing screen, by swiveling the shield to a side of the viewing screen, and rolling the shield upon itself being constructed of a flexible substrate.

8. The apparatus of claim 7 wherein the camera is built into the ambient light shield.

9. The apparatus of claim 6 wherein the housing is connected to a portable computer.

10. The apparatus of claim 6 further comprising a second ambient light shield hingedly attached to the transparent-reflective panel.

11. A non-retracting dual position eye contact apparatus which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel utilized in a first position creating a reflection of a conferee for image capturing by a camera while that conferee observes the viewing screen through the transparent-reflective panel and in a second position permitting the conferee to observe the viewing screen directly without having to look through the transparent-reflective panel;

a transparent-reflective panel repositioning means which repositions the panel from the first position to the second position by one of flipping a bottom of the panel over a top of the panel so the panel may rest behind the viewing screen, by swiveling the panel to a side of the viewing screen, and rolling the panel upon itself away from the viewing screen being constructed of a flexible substrate; and a transparent-reflective panel support stand supporting the panel in both the first position and the second position so that panel does not require mounting to the housing.

12. The apparatus of claim 11 further comprising an ambient light shield utilized for blocking unwanted light from striking the transparent-reflective panel while the panel is in the first position and an ambient light shield repositioning means which repositions the shield to the panel's second position by one of flipping a bottom of the shield over a top of the shield so the shield may rest behind the viewing screen, by swiveling the shield to a side of the viewing screen, and rolling the shield upon itself being constructed of a flexible substrate.

13. The apparatus of claim 11 wherein the camera is built into the ambient light shield.

14. The apparatus of claim 11 wherein the housing is connected to a portable computer.

15. The apparatus of claim 11 further comprising a second ambient light shield hingedly attached to the transparent-reflective panel.

16. A dual position foldable eye contact apparatus which permits in a first position the capturing of eye contact images of a conferee for transmission to a distant terminal and in a second position permits the conferee to observe a viewing screen without the intrusion of a transparent-reflective panel protruding at an angle from the viewing screen, the apparatus comprising:

a display having a viewing screen;

a housing containing the display;

a transparent-reflective panel, resting in front of and angled between 30 and 60 degrees to the viewing screen, utilized in a first position creating a reflection of a conferee for image capturing by a camera while that conferee observes the viewing screen through the transparent-reflective panel and in a second position permitting the conferee to observe the viewing screen through the transparent-reflective panel while that panel rests approximately parallel to the viewing screen;

a transparent-reflective panel folding means for folding the panel between the first position and the second position; and a reflection reduction means to reduce excessive reflections upon the transparent-reflective panel when it is resting in the second position.

17. The apparatus of claim 16 wherein the reflection reduction means is provided by an ambient light shield that is a neutral density transparent substrate for blocking unwanted ambient light from the transparent-reflective panel in the first position and positionable parallel to the transparent-reflective panel and the viewing screen and viewed through to see the viewing screen in the second position.

18. The apparatus of claim 17 wherein the camera is removably attached to the ambient light shield.

19. The apparatus of claim 16 wherein the reflection reduction means is provided a transparent reflective coating upon the transparent-reflective panel that has a higher reflective value when viewed from an angle in the first position and a lower reflective value when viewed straight on in the second position.

20. The apparatus of claim 16 wherein the transparent-reflective panel folding means is a hinge.

21. The apparatus of claim 16 wherein at least one of the transparent-reflective panel, the transparent reflective panel folding means, the reflection reduction means, and the camera are built into the display.

22. The apparatus of claim 16 wherein at least one of the transparent-reflective panel, the transparent reflective panel folding means, the reflection reduction means, and the camera are removably attached to the display.

23. The apparatus of claim 16 wherein the transparent reflective panel, the transparent reflective panel folding means, the reflection reduction means, and the camera are supported by a support stand separate from the housing.

24. The apparatus of claim 16 wherein the housing is connected to a portable computer.

25. The apparatus of claim 16 further comprising a second ambient light shield hingedly attached to the transparent-reflective panel.

26. A non-retracting dual position eye contact apparatus which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel mounted to the housing and utilized in a first position creating a reflection of a conferee for image capturing by a camera while that conferee observes the viewing screen through the transparent-reflective panel and in a second position permitting the conferee to observe the viewing screen directly without having to look through the transparent-reflective panel;

an ambient light shield, for blocking unwanted ambient light from striking the transparent-reflective panel, positioned in front of the viewing screen in the first position;

a folding connection means permitting the transparent reflective panel to be closed upon the ambient light shield; and a releasable connection means for permitting the connectable releasing of the transparent-reflective panel, ambient light shield, folding connection means and the camera from the front of the viewing screen in the second position for storage separate from the housing.

27. The apparatus of claim 26 wherein the housing is connected to a portable computer.

28. The apparatus of claim 26 wherein the camera is fabricated as apart of the ambient light shield.

29. The apparatus of claim 26 wherein the camera is removably attached to the ambient light shield.

30. The apparatus of claim 26 wherein the folding connection means is a hinge.

31. The apparatus of claim 26 further comprising a second ambient light shield hingedly attached to the transparent-reflective panel.

32. A non-retracting dual position eye contact apparatus which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel connectably fabricated as apart of the housing and utilized in a first position creating a reflection of a conferee for image capturing by a camera while that conferee observes the viewing screen through the transparent-reflective panel and in a second position permitting the conferee to observe the viewing screen directly without having to look through the transparent-reflective panel;

an ambient light shield, for blocking unwanted ambient light from striking the transparent-reflective panel, positioned in front of the viewing screen in the first position;

a folding connection means permitting the transparent reflective panel to be closed upon the ambient light shield; and a releasable connection means connectably fabricated as a part of the housing for permitting the connectable releasing of the transparent-reflective panel, ambient light shield, folding connection means and the camera from the front of the viewing screen in the second position for storage separate from the housing.

33. The apparatus of claim 32 wherein the housing is connected to a portable computer.

34. The apparatus of claim 32 wherein the camera is fabricated as apart of the ambient light shield.

35. The apparatus of claim 32 wherein the camera is removably attached to the ambient light shield.

36. The apparatus of claim 32 wherein the folding connection means is a hinge.

37. The apparatus of claim 32 further comprising a second ambient light shield hingedly attached to the transparent-reflective panel.

38. A non-retracting dual position eye contact apparatus which permits in a first position the capturing of eye contact images of a conferee for transmission to a distant terminal and in a second position permits the conferee to have direct access to a viewing screen, the apparatus comprising:

a display having a viewing screen;

a housing containing the display;

a transparent-reflective panel utilized in a first position creating a reflection of a conferee for image capturing by a camera while that conferee observes the viewing screen through the transparent-reflective panel and in a second position permitting the conferee to observe the viewing screen directly without having to look through the transparent-reflective panel;

an ambient light shield, for blocking unwanted ambient light from striking the transparent-reflective panel, positioned in front of the viewing screen in the first position;

a folding connection means permitting the transparent reflective panel to be closed upon the ambient light shield; and a transparent-reflective panel support stand supporting the panel, ambient light shield and the camera in the first position so that they are not mounted to the display housing; and a releasable connection means permitting the connectable releasing of the transparent-reflective panel, ambient light shield, folding connection means and the camera from the support stand in the second position for storage separate from the housing.

39. The apparatus of claim 38 wherein the housing is connected to a portable computer.

40. The apparatus of claim 38 wherein the camera is fabricated as apart of the ambient light shield.

41. The apparatus of claim 38 wherein the camera is removably attached to the ambient light shield.

42. The apparatus of claim 38 wherein the folding connection means is a hinge.

43. The apparatus of claim 38 further comprising a second ambient light shield hingedly attached to the transparent-reflective panel.

44. A dual position eye contact apparatus which permits in a first position the capturing of eye contact images of a conferee for transmission to a distant terminal and in a second position permits the conferee to observe a viewing screen without the intrusion of a transparent-reflective panel protruding at an angle from the viewing screen, the apparatus comprising:

a display having a viewing screen;

a housing containing the display;

a transparent-reflective panel fabricated from a flexible substrate, resting in front of and angled between 30 and 60 degrees to the viewing screen, utilized in a first position creating a reflection of a conferee for image capturing by a camera while that conferee observes the viewing screen through the transparent-reflective panel and in a second position permitting the conferee to observe the viewing screen through the transparent-reflective panel while that panel rests approximately parallel to the viewing screen;

a transparent-reflective panel folding means for folding the panel between the first position and the second position; and a transparent-reflective panel rolling means for rolling up the flexible substrate to an area of the panel that is substantially reduced in reflectivity, the reduced reflective area disposed over the viewing screen in the second position.

45. The apparatus of claim 44 wherein the housing is connected to a portable computer.

46. A portable computer eye contact apparatus for transmitting images to a distant terminal, the apparatus comprising:

a housing containing a computer and hingedly attached to a housing containing a display having a viewing screen;

a housing containing a keyboard for operating the computer; and a detachable connecting means so that the keyboard when removed from the computer exposes a camera aimed upward toward a transparent reflective panel angled between 30 and 60 degrees to the viewing screen, the transparent-reflective panel utilized for creating a reflection of a conferee for image capturing by the camera while that conferee observes the viewing screen through the transparent-reflective panel.

47. The apparatus of claim 46 wherein the transparent-reflective panel at least one of folds up upon the viewing screen, rolls away from the viewing screen, folds over the top of the viewing screen, swivels to the side of the viewing screen, detaches from the housings, and is supported by a separate stand which is removable from the viewing screen.

48. A projector for projecting the display screen of a portable computer, the apparatus comprising:

a projector housing with an opening to receive a display screen of a portable computer;

a projection system for projecting the image of the display screen; and a light amplification system for increasing the brightness of the projected image.

49. The apparatus of claim 48 wherein the projector housing is portable.

50. The apparatus of claim 48 wherein the projected image is visible upon a rear projection screen.

51. The apparatus of claim 50 wherein the a camera is aimed through the rear projection screen for eye contact videoconferencing.

52. A rear projection eye contact apparatus for transmitting images to a distant terminal, the apparatus comprising:

a projector for projecting an image of a first conferee transmitted form a distant terminal;

a camera for capturing images of a second conferee for transmission to the distant terminal; and a rear projection screen with a first focal point range that is clear so that the camera can capture an image of the second conferee through the screen and a second focal point range in which the screen is diffused permitting the projected image to form a visible image that is observable by the second conferee.

* * * * *